Patented May 26, 1936

2,042,423

UNITED STATES PATENT OFFICE 2,042,423

PROCESS FOR THE MANUFACTURE OF DYESTUFFS OF THE ANTHRAQUINONE SERIES

William Dettwyler, Milwaukee, Wis., assignor to E. I. du Pont de Nemours & Company, Wilmington, Del., a corporation of Delaware No Drawing. Application September 23, 1935, Serial No. 41,773

5 Claims. (Cl. 260—17)

This invention relates to an improved process for the manufacture of dyestuffs of the anthraquinone series and more particularly to the purification of dyestuffs obtained by the fusion of 2-methyl-anthraquinone compounds with sulfur.

Heretofore the free sulfur remaining in the fusion mass resulting from the fusion of beta-methyl-anthraquinone compounds with sulfur in the absence of solvents has been extracted by means of sulfur solvents such as carbon disulfide and sodium sulfide solution. The product must then be freed from the solvent and dried before it can be acid pasted and oxidized to give the final color.

It is the object of the present invention to provide an improved process for the preparation of sulfur dyestuffs of the anthraquinone series.

It is a further object to provide a process for the separation of free sulfur from sulfur-containing anthraquinone dyestuffs by a simple and economical procedure and from which the dyestuffs are obtained directly in substantially pure form.

According to the present invention the crude sulfur fusion mass resulting from the fusion of a beta-methyl-anthraquinone compound with sulfur is heated with sulfuric acid to a temperature above the melting point of the sulfur, then cooled to solidify the sulfur in crystalline form, which is then filtered from the mass; the acid concentration at the time of filtering being sufficiently high to retain all of the dyestuff in solution. The concentration of the sulfuric acid in which the crude dyestuff is originally heated should be preferably between 78% and 100%. The use of more dilute acid for this step requires the addition of too large an amount of oleum, for finally dissolving the dyestuff, before filtration, to be economically practical.

In the preparation of sulfur dyestuffs from beta-methyl-anthraquinone and omega-halogen-beta-methyl-anthraquinones, the crude color is suspended in sulfuric acid and subjected to an oxidation treatment. For the preparation of the yellow dyestuff of this series, this acid treatment is usually carried out at room temperature. In the preparation of the orange dyestuff, the sulfur extracted product is heated in concentrated sulfuric acid at temperatures of about 100°. In both cases the sulfuric acid solution is finally diluted to precipitate the dyestuff, and an oxidizing agent is added to the dilute sulfuric acid suspension to oxidize impurities contained therein.

I have found the sulfur can be extracted by heating the sulfur fusion mass in sulfuric acid at a temperature above the melting point of the sulfur, and after the sulfur has been removed by cooling and filtering, the color can then be subjected to the usual oxidation without isolation.

In the preparation of the yellow dyestuff of this series, sulfuric acid of less than 92% should be used, for when the crude fusion product is heated with higher concentrated acid the yellow dyestuff is converted to the orange dyestuff. In the treatment of the yellow dyestuff oleum must therefore be added after the sulfur has been crystallized to again redissolve the color prior to filtration. Even in some cases where concentrated sulfuric acid is used for dissolving the crude product, it is necessary to add oleum to redissolve some precipitated dyestuff, for a part of the sulfuric acid apparently reacts on the sulfur and is used up. After filtering off the sulfur the residue is thoroughly washed with concentrated sulfuric acid to free it from any color and the dye is then precipitated by diluting the sulfuric acid solution. It may then be oxidized in the usual manner by the addition of suitable oxidizing agents, such as sodium chlorate and salt, sodium hypochlorite, etc.

A more pure product is obtained by this process than by the use of sulfur solvents and the additional step of drying down the product and the elimination of the sulfur solvent prior to the acid treatment is obviated.

The process is applicable to any of the products prepared by the sulfur fusion of beta-methyl-anthraquinone compounds, such as beta-methyl-anthraquinone, omega-mono- or di-chloro-beta-methyl-anthraquinone, their halogen or amino substitution products or beta-methyl-benzanthrone, when the fusion is carried out in the absence of solvents such as alcohol, naphthalene, etc.

The following examples are given to more fully illustrate my invention. Parts used are by weight.

*Example 1*

Heat 1 part of finely ground fusion product (obtained from sulfur and 2-methyl-anthraquinone at 265° C.) in 3 parts of sulfuric acid, 97%, to 140° C. Hold at this temperature for 3 hours and cool slowly to room temperature. Then add 3 parts of oleum (25%), stir one hour and filter on a carborundum plate. Wash the cake which consists of sulfur with monohydrate until no more color is extracted. Dilute the filtrate with water and oxidize in this acid suspension with salt and sodium chlorate at the boil until a bright paste is obtained, filter and wash. The dyestuff dyes cotton in orange shades.

*Example 2*

Heat 1 part of the finely ground fusion product (obtained as mentioned in Example 1) in 3 parts of sulfuric acid 90% and heat to 120° C. Hold 1 hour and cool slowly to room temperature. Then add 3 parts of oleum (25%) and stir one hour. This will dissolve all the dyestuff. Filter on a carborundum plate and wash the sulfur cake with monohydrate until no more color is extracted. Dilute the filtrate with water and oxidize the paste in this acid suspension with salt and sodium chlorate at the boil until a bright yellow paste is obtained. Filter and wash. The dyestuff so obtained dyes cotton in bright yellow shades.

As stated above, the concentration of the sulfuric acid solution during the preliminary heating of the mass to put the sulfur in liquid state may vary from 78% to monohydrate, depending upon the desired shade of the ultimate product. On heating the dyestuff in sulfuric acid of 92% strength or higher, an orange dyestuff is obtained. The temperature used may vary between 120 and 140°, it being necessary to employ temperatures only sufficiently high to melt the sulfur. The mass should be cooled slowly to below 100° C., so that the sulfur will be crystallized in large enough particles to filter easily. The solution may be filtered at any temperature below 100°.

I claim:

1. In the process for preparing sulfur-containing dyestuffs of the anthraquinone series, wherein a beta-methyl-anthraquinone is fused with sulfur in the absence of added solvents, the step of freeing the final product from residual sulfur which comprises heating the crude fusion product in sulfuric acid at a temperature sufficiently high to put the sulfur in a molten state, cooling the mass to solidify the sulfur, and filtering the solution, the acid concentration being maintained sufficiently high to retain the dyestuff in solution during the filtering operation.

2. The process which comprises heating an impure dyestuff obtainable by the fusion of beta-methyl-anthraquinone with sulfur, which still contains free sulfur, in sulfuric acid at a temperature sufficiently high to put the sulfur in a molten state, cooling the mass to solidify the sulfur and filtering the solution, the acid concentration at the time of filtration being high enough to completely dissolve the dyestuff.

3. The process which comprises heating the sulfur dyestuff obtained by the fusion of 2-methyl-anthraquinone with sulfur in sulfuric acid to 120-140° C. until all the sulfur is melted, cooling to below 100° C., adjusting the acid concentration to about 98% and filtering the solution to free from precipitated sulfur.

4. The process which comprises heating the fusion product obtained by the fusion of sulfur and 2-methyl-anthraquinone, in sulfuric acid of above 92%, at a temperature of from about 120-140° C., cooling the mass to approximately room temperature, adding sufficient oleum to bring the concentration of the sulfuric acid solution to about 98%, filtering the solution to free the same from sulfur, diluting the filtrate until the dyestuff is thrown out of solution, treating the mass with an oxidizing agent and filtering off the resultant dyestuff, 5. The process which comprises heating the fusion product obtained by the fusion of sulfur and 2-methyl-anthraquinone, in sulfuric acid of below 92% at a temperature of from about 120-140° C., cooling the mass to approximately room temperature, adding sufficient oleum to bring the concentration of the sulfuric acid solution to about 98%, filtering the solution to free the same from sulfur, diluting the filtrate until the dyestuff is thrown out of solution, treating the mass with an oxidizing agent and filtering off the resultant dyestuff.

WILLIAM DETTWYLER.